United States Patent

Uenaka

(10) Patent No.: US 8,064,760 B2
(45) Date of Patent: Nov. 22, 2011

(54) DUST REMOVAL APPARATUS OF PHOTOGRAPHING APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/912,146

(22) Filed: Oct. 26, 2010

(65) Prior Publication Data

US 2011/0038621 A1 Feb. 17, 2011

Related U.S. Application Data

(62) Division of application No. 11/869,018, filed on Oct. 9, 2007, now abandoned.

(30) Foreign Application Priority Data

| Oct. 10, 2006 | (JP) | 2006-276573 |
| Oct. 10, 2006 | (JP) | 2006-276602 |

(51) Int. Cl.
G03B 17/00 (2006.01)

(52) U.S. Cl. .............. 396/55; 359/507; 359/554

(58) Field of Classification Search .......... 396/55, 396/429; 359/507, 554
See application file for complete search history.

(56) References Cited

U.S. PATENT DOCUMENTS

| 5,294,991 A | 3/1994 | Oshima et al. |
| 5,526,045 A * | 6/1996 | Oshima et al. ............ 348/208.5 |
| 7,355,649 B2 | 4/2008 | Takai |
| 7,408,728 B2 * | 8/2008 | Bloch et al. ............ 359/820 |
| 7,580,628 B2 | 8/2009 | Ide et al. |
| 2004/0169761 A1 * | 9/2004 | Kawai et al. ............ 348/335 |
| 2005/0264656 A1 | 12/2005 | Seo et al. |
| 2006/0279638 A1 | 12/2006 | Matsuda et al. |
| 2007/0052823 A1 * | 3/2007 | Harada ............ 348/251 |
| 2008/0037980 A1 | 2/2008 | Okumura et al. |
| 2008/0084492 A1 | 4/2008 | Uenaka et al. |
| 2008/0084505 A1 | 4/2008 | Uenaka |

FOREIGN PATENT DOCUMENTS

| JP | 2004-56368 | 2/2004 |
| JP | 2005-340988 | 12/2005 |

* cited by examiner

Primary Examiner — W. B. Perkey
Assistant Examiner — Linda B Smith
(74) Attorney, Agent, or Firm — Greenblum & Bernstein, P.L.C.

(57) ABSTRACT

A dust removal apparatus of a photographing apparatus comprises a movable unit and a controller. The movable unit has an imaging device and is movable. The controller moves the movable unit on a plane that is parallel to a first direction and a second direction. The first direction is perpendicular to an optical axis of a photographing optical system that captures an optical image on a photographing surface of the imaging device. The second direction is perpendicular to the first direction and the optical axis. The controller moves the movable unit to a predetermined position that does not make contact with a boundary of a range of movement of the movable unit, and strikes the movable unit against the boundary of the range of movement in the second direction under the condition where a coordinate value in the first direction of the movable unit is held constant, as a dust removal operation.

7 Claims, 13 Drawing Sheets

DUST REMOVAL APPARATUS OF PHOTOGRAPHING APPARATUS

CROSS-REFERENCE TO RELATED APPLICATION

This application is a divisional of pending U.S. application Ser. No. 11/869,018, filed on Oct. 9, 2007, which claims priority of Japanese Application No. 2006-276573, filed Oct. 10, 2006 and Japanese Application No. 2006-276602, filed on Oct. 10, 2006, the disclosure of each of which is expressly incorporated herein by reference in its entirety.

BACKGROUND OF THE INVENTION

1. Field of the Invention

The present invention relates to a dust removal apparatus of a photographing apparatus, and in particular to restrain damage to the mechanism caused by the dust removal operation.

2. Description of the Related Art

A dust removal apparatus of a photographing apparatus that removes the dust on the imaging device and the cover such as the low-pass filter, is proposed.

Japanese unexamined patent publication (KOKAI) No. 2005-340988 discloses a dust removal apparatus that strikes the movable unit including the imaging device against the boundary of the range of movement of the movable unit so that the shock of impact will remove the dust on the imaging device and the cover etc.

However, the mechanism that includes the movable unit may sustain damage caused by the shock of impact.

SUMMARY OF THE INVENTION

Therefore, an object of the present invention is to provide a dust removal apparatus that reduces damage the mechanism during the dust removal operation and removes the dust more efficiently.

According to the present invention, a dust removal apparatus of a photographing apparatus comprises a movable unit and a controller. The movable unit has an imaging device and is movable. The controller moves the movable unit on a plane that is parallel to a first direction and a second direction. The first direction is perpendicular to an optical axis of a photographing optical system that captures an optical image on a photographing surface of the imaging device. The second direction is perpendicular to the first direction and the optical axis. The controller moves the movable unit to a predetermined position that does not make contact with a boundary of a range of movement of the movable unit, and strikes the movable unit against the boundary of the range of movement in the second direction under the condition where a coordinate value in the first direction of the movable unit is held constant, as a dust removal operation.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
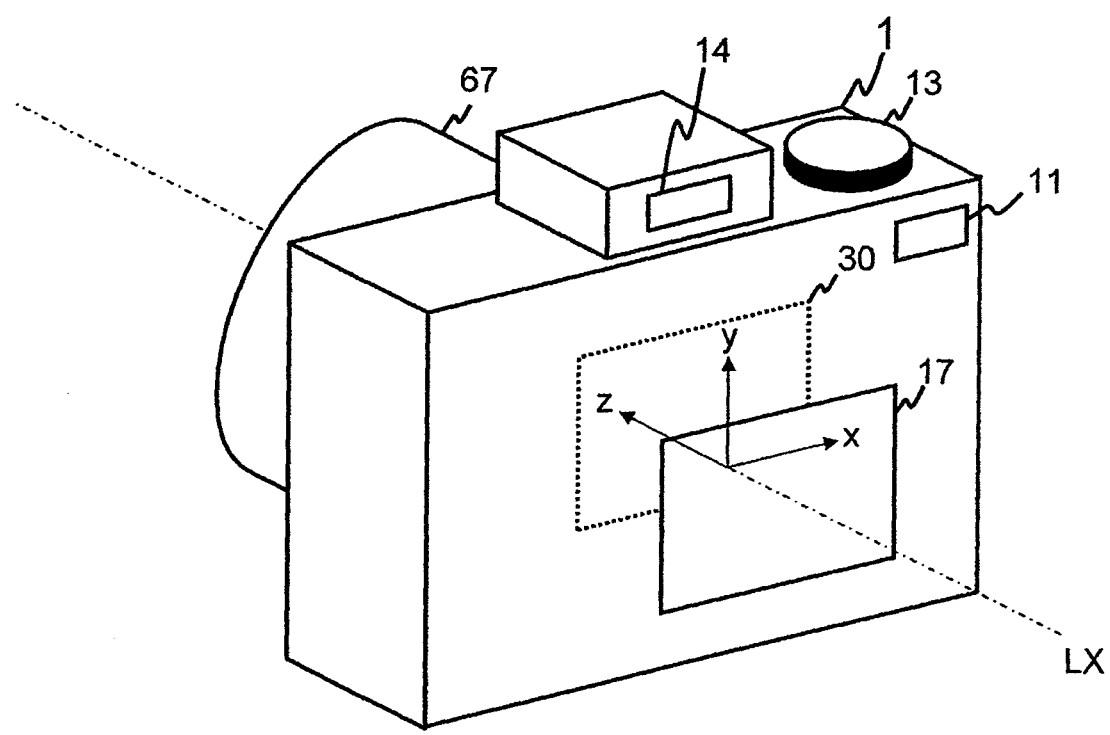
FIG. 1 is a rearview perspective of the first and second embodiments of the photographing apparatus viewed from the back side.

The present invention is described below with reference to the first and second embodiments shown in the drawings. In the first and second embodiments, the photographing apparatus 1 is a digital camera. A photographing optical system, such as a camera lens 67 etc., that captures (images) an optical image on a photographing surface of the imaging device of the photographing apparatus 1 has an optical axis LX.

In order to explain the orientation of the first and second embodiments, a first direction x, a second direction y, and a third direction z are defined (see FIG. 1). The first direction x is perpendicular to the optical axis LX. The second direction y is perpendicular to the optical axis LX and the first direction x. The third direction z is parallel to the optical axis LX and perpendicular to both the first direction x and the second direction y.

The first embodiment is explained.

Figure 2:
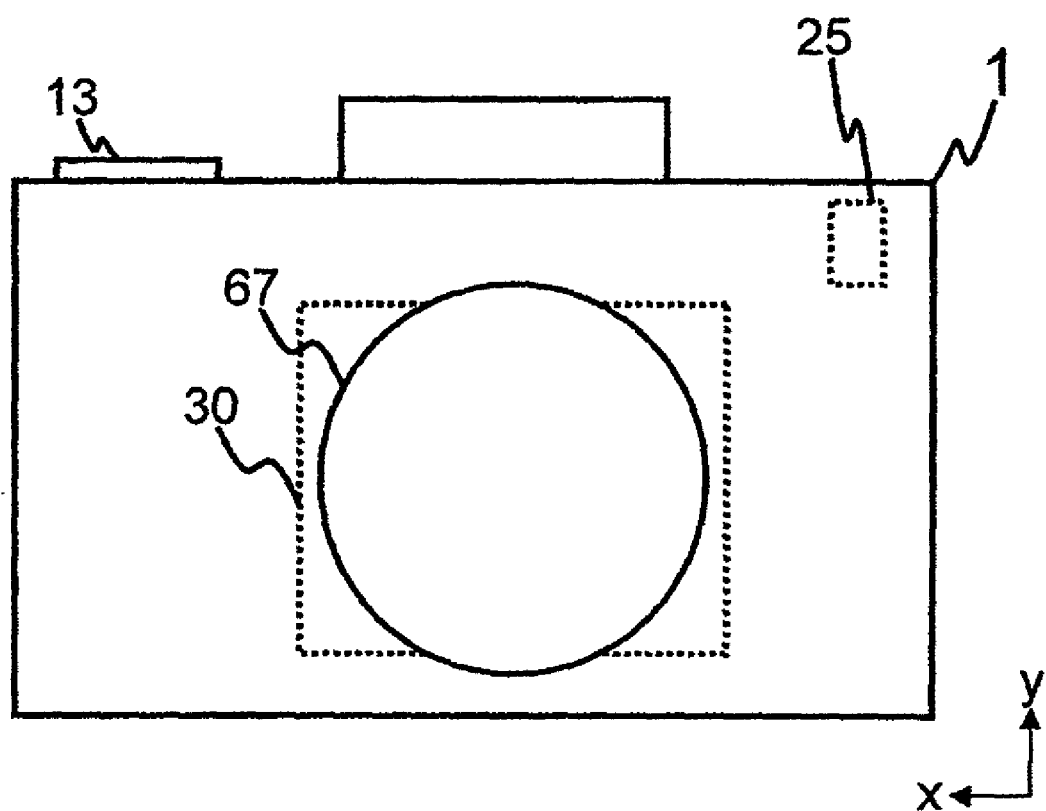
FIG. 2 is a front view of the photographing apparatus.
Figure 3:
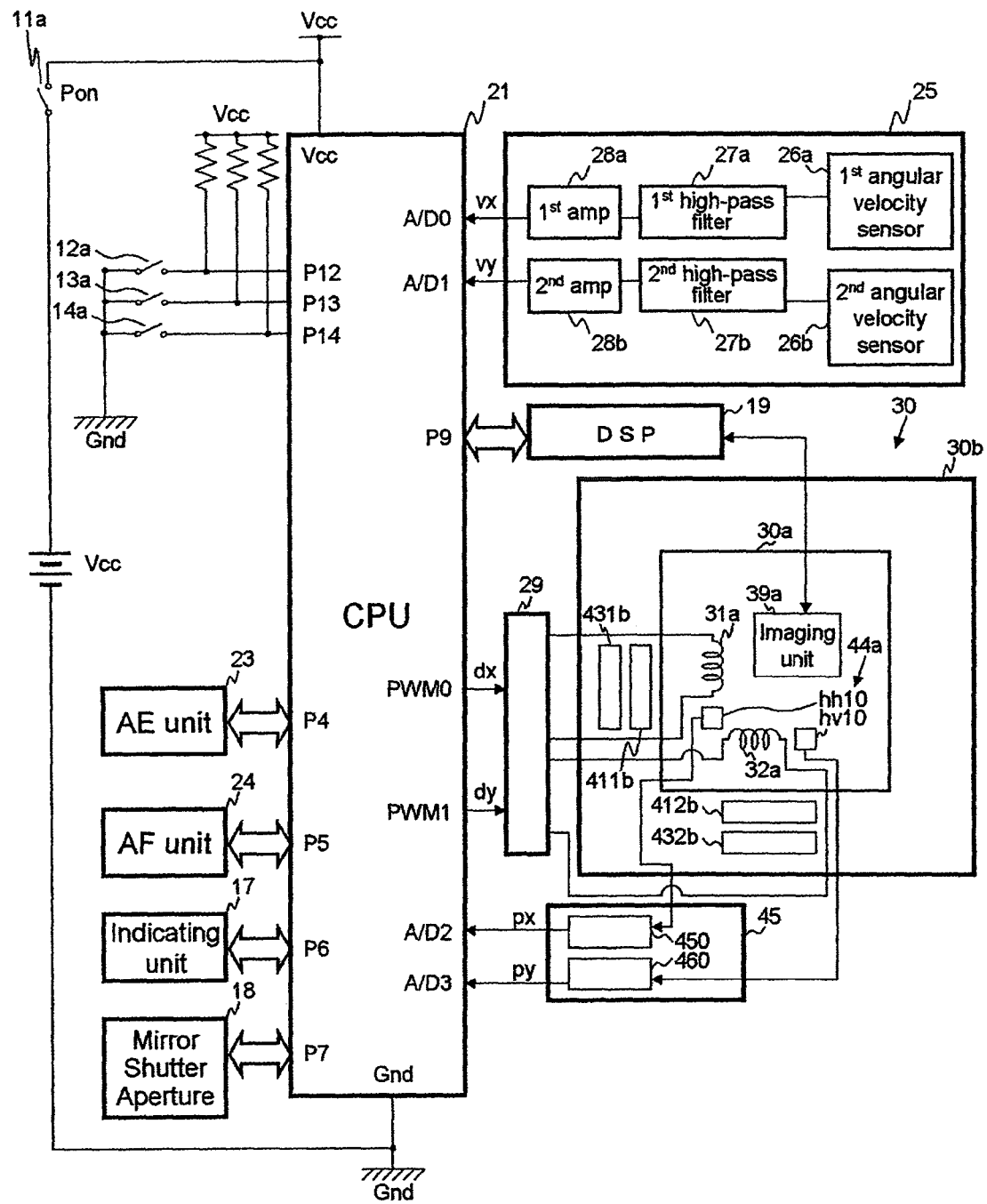
FIG. 3 is a circuit construction diagram of the photographing apparatus in the first embodiment.

The imaging and dust removal part (the dust removal apparatus) of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a mirror-aperture-shutter unit 18, a DSP 19, a CPU 21, an AE (automatic exposure) unit 23, an AF (automatic focus) unit 24, an anti-shake unit 30, and a camera lens 67 (see FIGS. 1, 2, and 3).

Whether the PON switch 11a is in the ON state or the OFF state is determined by the state of the PON button 11, so that the ON/OFF states of the photographing apparatus 1 correspond to the ON/OFF states of the PON switch 11a.

The photographic subject image is captured as the optical image through the camera lens 67 by the imaging unit 39a, and the captured image is displayed on the indicating unit 17. The photographic subject image can be optically observed by the optical finder (not depicted).

Further, after the PON button 11 is depressed so that the photographing apparatus 1 is set to the ON state, a dust removal operation is performed in a first time period (220 ms).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image which is captured, is stored.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the release switch 13a.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39a.

The CPU 21 is a control apparatus that controls each part of the photographing apparatus 1 regarding the imaging operation, the dust removal operation, and the anti-shake operation (i.e. the image stabilizing operation). The anti-shake operation includes both the movement of the movable unit 30a and position-detection efforts.

Further, the CPU 21 stores a value of the anti-shake parameter IS that determines whether the photographing apparatus 1 is in the anti-shake mode or not, a value of a release state parameter RP, a value of a dust removal state parameter GP, and a value of a dust removal time parameter CNT.

The value of the release state parameter RP changes with respect to the release sequence operation. When the release sequence operation is performed, the value of the release state parameter RP is set to 1 (see steps S24 to S31 in FIG. 4); and when the release sequence operation is finished, the value of the release state parameter RP is set (reset) to 0 (see steps S13 and S32 in FIG. 4).

The dust removal state parameter GP is a parameter that indicates, whether the dust removal operation is finished.

Figure 4:
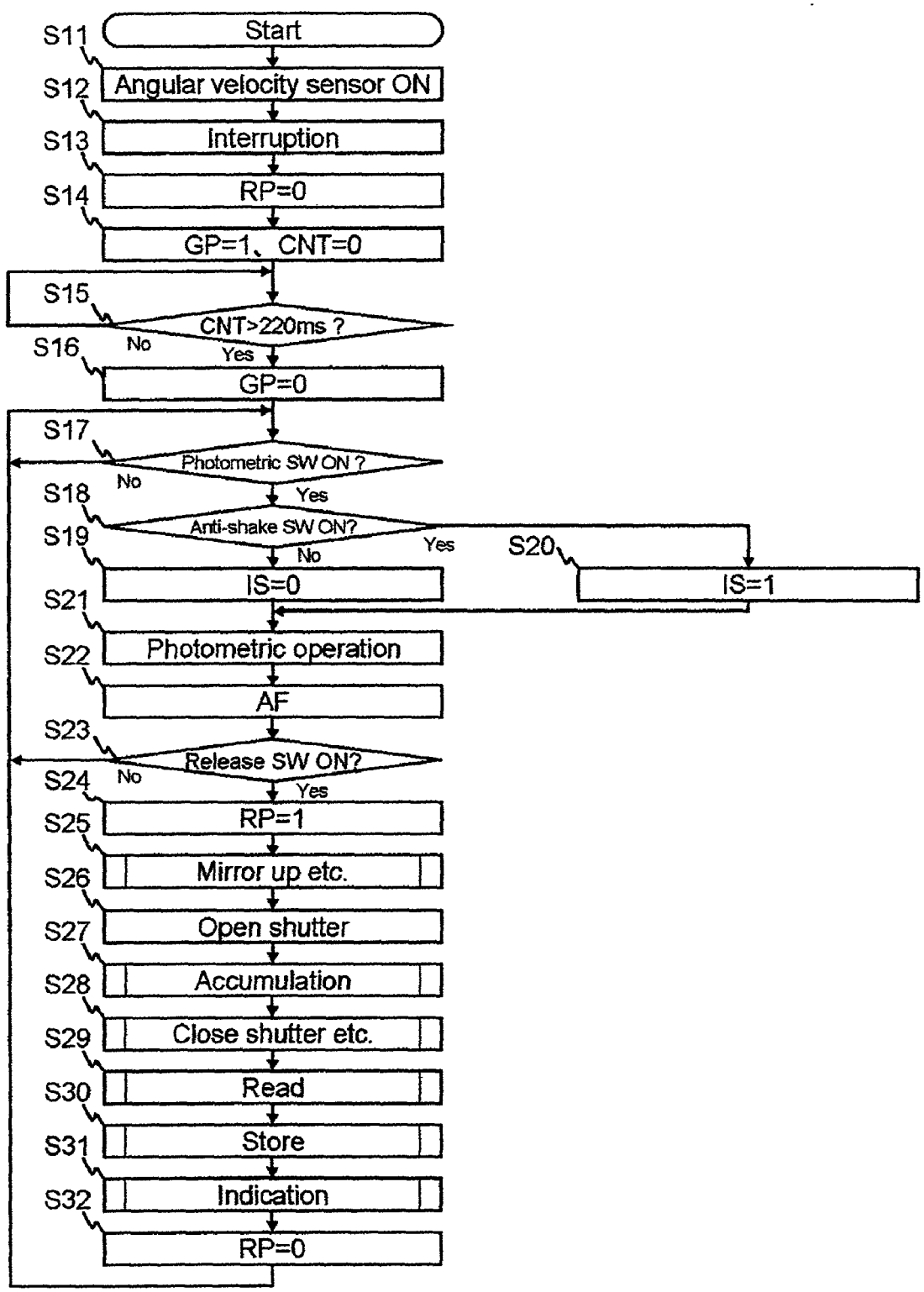
FIG. 4 is a flowchart that shows the main operation of the photographing apparatus in the first embodiment.

The value of the dust removal state parameter GP is set to 1 when the dust removal operation is underway, from the point immediately after the photographing apparatus 1 is set to the ON state until the first time period (220 ms) has elapsed (see step S14 in FIG. 4).

The value of the dust removal state parameter GP is set to 0 when the dust removal operation is finished, from the point when the first time period (220 ms) has elapsed after the photographing apparatus 1 is set to the ON state (see step S16 in FIG. 4).

The dust removal time parameter CNT is used for measuring the length of time the dust removal operation is underway. An initial value of the dust removal time parameter CNT is set to 0. While the dust removal operation is being performed, the value of the dust removal time parameter CNT is increased by the value of 1 at every predetermined time interval of 1 ms. (see step S71 in FIG. 7).

Figure 7:
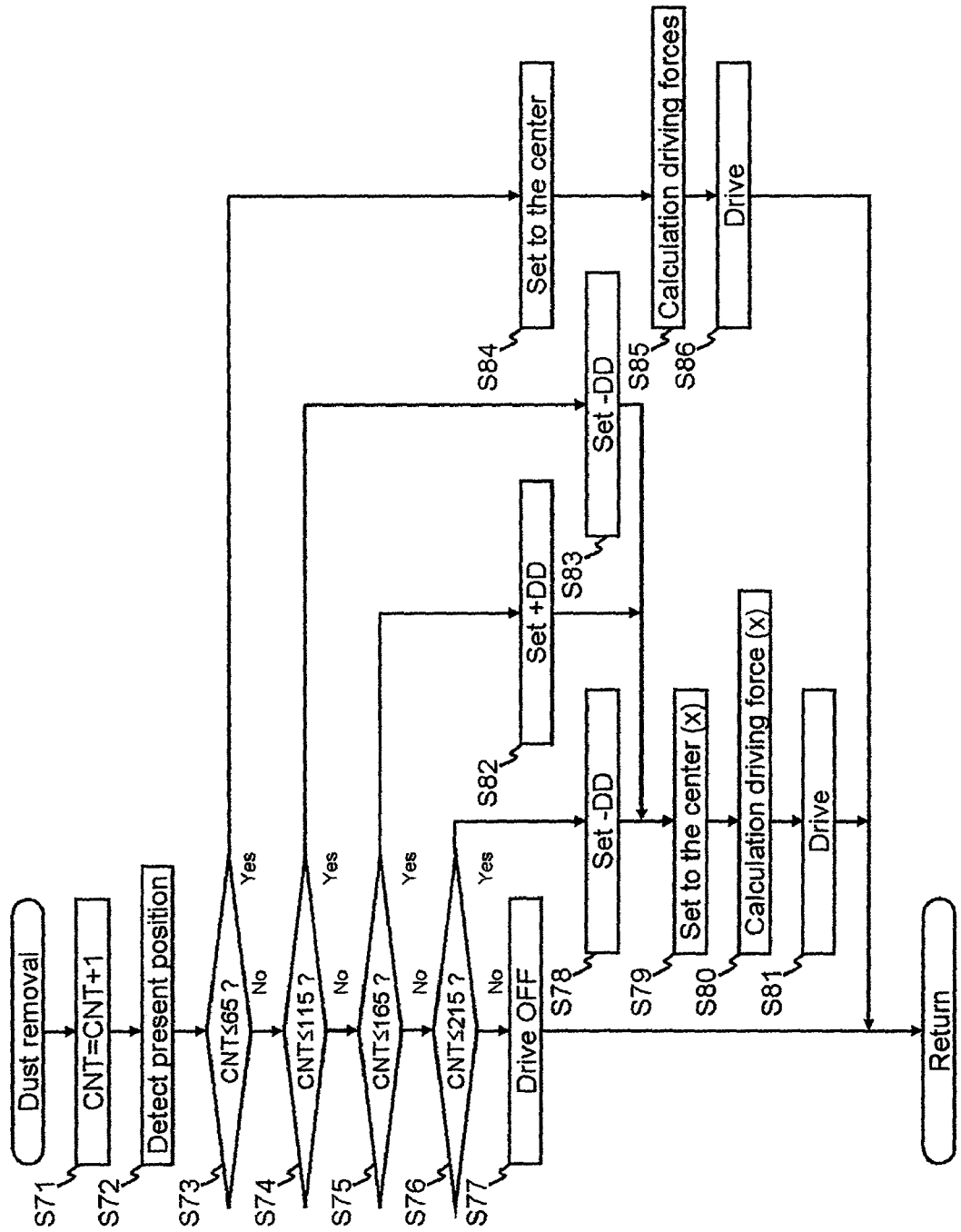
FIG. 7 is a flowchart that shows the dust removal operation in the first and second embodiments.

The CPU 21 moves the movable unit 30a to the predetermined position in the dust removal operation before the anti-shake operation (the centering operation, see step S84 in FIG. 7). In the first embodiment, the predetermined position is the center of the range of movement (where the coordinate values in the first direction x and in the second direction y are both 0).

Then, the CPU 21 moves the movable unit 30a in the second direction y to strike against one side of the boundary of the range of movement of the movable unit 30a under the condition where the coordinate value in the first direction x of the movable unit 30a is held constant at the center (a primary collision, see step S83 in FIG. 7). Next, the CPU 21 moves the movable unit 30a in the opposite direction to strike against the other side of the boundary of the range of movement of the movable unit 30a under the condition where the coordinate value in the first direction x of the movable unit 30a is held constant at the center (a secondary collision, see step S82 in FIG. 7). Finally, the CPU 21 moves the movable unit 30a again in the second direction y to strike against one side of the boundary of the range of movement of the movable unit 30a under the condition where the coordinate value in the first direction x of the movable unit 30a is held constant at the center (a final collision, see step S78 in FIG. 7). Namely, the movable unit 30a strikes against the boundary of the range of movement of the movable unit 30a (against the fixed unit 30b) three times in total, during one dust removal operation.

The dust on the imaging unit 39a of the movable unit 30a (the imaging device and the low-pass filter) is removed by the shock of the impact of the movable unit 30a against the boundary of the range of movement of the movable unit 30a.

After the dust removal operation is complete, the anti-shake operation commences.

Specifically, in the primary collision of the dust removal operation, the movable unit 30a is moved from the predetermined position (the center of the range of movement) to one (first) side of the boundary of the range of movement of the movable unit 30a in the second direction y.

In the secondary collision of the dust removal operation, the movable unit 30a is moved from one side of the boundary of the range of movement of the movable unit 30a to the other side of the boundary of the range of movement of the movable unit 30a in the second direction y.

In the final collision of the dust removal operation, the movable unit 30a is moved from the other side of the boundary of the range of movement of the movable unit 30a to back to the first side of the boundary of the range of movement of the movable unit 30a in the second direction y.

Therefore, a force of impact in the primary collision is less than a force of impact in the secondary (and final) collision.

With the smaller force of impact in the primary collision, the movable unit 30a is prepared (primed) in a condition to facilitate the ease of dust removal. Next, by the large force of impact in the secondary (or final) collision, whose force of impact is greater than that of the primary collision, the dust on the imaging unit 39a of the movable unit 30a is removed.

Therefore, damage to the imaging device of the imaging unit 39a can be restrained and the dust can be removed efficiently, compared to the case where the movable unit 30a is moved to the boundary of the range of movement of the movable unit 30a without the centering operation.

Further, the CPU 21 stores values of a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at the predetermined time interval. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In the first embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut-off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state and the dust removal operation is finished.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly, the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 0 and indicates a length of time (ms) from the commencement of the interruption process of the timer, (t=0; see step S12 in FIG. 4) to the point when the latest anti-shake operation is performed (t=n).

Figure 6:
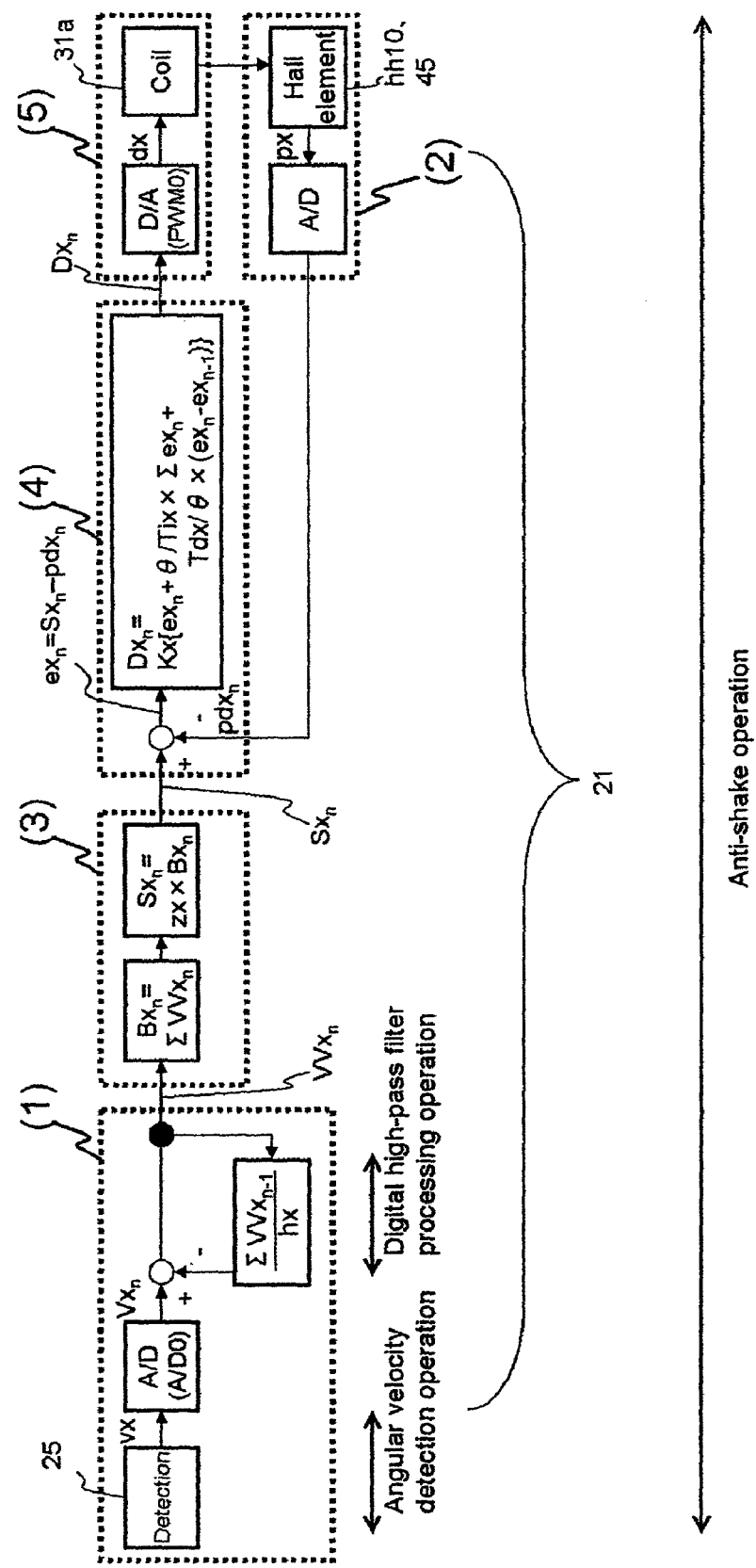
FIG. 6 is a figure that shows the calculations of the anti-shake operation in the first and second embodiments.

In the digital high-pass filter processing operation regarding the first direction x, the first digital angular velocity $VVx_n$ is calculated by dividing the summation of the first digital angular velocity $VVx_0$ to $VVx_{n-1}$ calculated by the interruption process of the timer before the 1 ms predetermined time interval (before the latest anti-shake operation is performed), by the first high-pass filter time constant hx, and then subtracting the resulting quotient from the first digital angular velocity signal $Vx_n$ ($VVx_n=Vx_n-(\Sigma VVx_{n-1})\div hx$, see (1) in FIG. 6).

In the digital high-pass filter processing operation regarding the second direction y, the second digital angular velocity $VVy_n$ is calculated by dividing the summation of the second digital angular velocity $VVy_0$ to $VVy_{n-1}$ calculated by the interruption process of the timer before the 1 ms predetermined time interval (before the latest anti-shake operation is performed), by the second high-pass filter time constant hy, and then subtracting the resulting quotient from the second digital angular velocity signal $Vy_n$ ($VVy_n=Vy_n-(\Sigma VVy_{n-1})\div hy$).

In the first embodiment, the angular velocity detection operation in (portion of) the interruption process of the timer includes a process in the angular velocity detection unit 25 and a process of inputting the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_0$ at the point when the interruption process of the timer commences, t=0, (see step S12 in FIG. 4) to the first digital angular velocity $VVx_n$ at the point when the latest anti-shake operation is performed (t=n), ($Bx_n=\Sigma VVx_n$, see (3) in FIG. 6).

Similarly, in the integration processing operation regarding the second direction y, the second digital displacement angle $By_n$ is calculated by the summation from the second digital angular velocity $VVy_0$ at the point when the interruption process of the timer commences to the second digital angular velocity $VVy_n$ at the point when the latest anti-shake operation is performed ($By_n=\Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) that is calculated for the first direction x and the second direction y on the basis of a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force, and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

The first PWM duty dx is a duty ratio of the driving pulse corresponding to the first driving force $Dx_n$. The second PWM duty dy is a duty ratio of the driving pulse corresponding to the second driving force $Dy_n$.

However, the position $S_n$ where the imaging unit 39a (the movable unit 30a) should be moved in the first time period (220 ms) for the dust removal operation before the anti-shake operation is performed, is set to a value that does not correspond to the hand-shake quantity (see step S79 in FIG. 7).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n=zx\times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n=zy\times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device during the exposure time when the anti-shake operation is performed (IS=1).

The anti-shake unit 30 has a fixed unit 30b that forms the boundary of the range of movement of the movable unit 30a, and a movable unit 30a which includes the imaging unit 39a and can be moved about on the xy plane that is parallel to the first direction x and the second direction y.

During the exposure time when the anti-shake operation is not performed (IS=0), the movable unit 30a is fixed to (held in) the predetermined position (at the center of the range of movement).

In the first time period (220 ms), after the photographing apparatus 1 is set to the ON state, the movable unit 30a is driven to the predetermined position that is the center of the range of movement. Next, the movable unit 30a is driven to (is struck against) the boundary of the range of movement in the second direction y.

Otherwise (except for the first time period and the exposure time), the movable unit 30a is not driven (moved).

The anti-shake unit 30 does not have a fixed-positioning mechanism that maintains the movable unit 30a in a fixed position when the movable unit 30a is not being driven (drive OFF state).

The driving of the movable unit 30a of the anti-shake unit 30, including movement to a predetermined fixed (held) position, is performed by the electro-magnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected position $P_n$ of the movable unit 30a, either before or after the movement effected by the driver circuit 29, is detected by the hall element unit 44a and the hall-element signal-processing unit 45.

Information regarding the first coordinate of the detected position $P_n$ in the first direction x, in other words a first detected position signal px, is input to the A/D converter A/D 2 of the CPU 21 (see (2) in FIG. 6). The first detected position signal px is an analog signal that is converted to a digital signal by the A/D converter A/D 2 (A/D conversion operation). The first coordinate of the detected position $P_n$ in the first direction x, after the A/D conversion operation, is defined as $pdx_n$ and corresponds to the first detected position signal px.

Information regarding the second coordinate of the detected position $P_n$ in the second direction y, in other words a second detected position signal py, is input to the A/D converter A/D 3 of the CPU 21. The second detected position signal py is an analog signal that is converted to a digital signal by the A/D converter A/D 3 (A/D conversion operation). The second coordinate of the detected position $P_n$ in the second direction y, after the A/D conversion operation, is defined as $pdy_n$ and corresponds to the second detected position signal py.

The PID (Proportional Integral Differential) control calculates the first and second driving forces $Dx_n$ and $Dy_n$ on the basis of the coordinate data for the detected position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$, see (4) in FIG. 6). The first subtraction value $ex_n$ is calculated by subtracting the first coordinate of the detected position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected position $P_n$ in the second direction y after the A/D conversion operation, $pdy_n$, from the coordinate of position $S_n$ in the second direction y, $Sy_n$ ($ey_n = Sy_n - pdy_n$).

The value of the sampling cycle θ is set to the predetermined time interval of 1 ms.

Driving the movable unit 30a to the position $S_n$, ($Sx_n$, $Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

In the dust removal operation, from the point when the photographing apparatus 1 is set to the ON state until the anti-shake operation commences, the movable unit 30a is first moved to the center of the range of movement, then moved to one side of the boundary of the range of movement in the second direction y (the primary collision), then moved to the opposite side of the boundary of the range of movement in the second direction y (the secondary collision), then moved again to the original side of the boundary of the range of movement in the second direction y (the final collision), in order. In this period, the coordinate of the movable unit 30a in the first direction x is held constant at the center.

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the first embodiment, the imaging device is a CCD; however, the imaging device may be another imaging device such as a CMOS etc.

A rectangle shape, which is the form of the imaging surface of the imaging device, has two sides that are parallel to the first direction x and has two sides that are parallel to the second direction y and that are shorter than the two sides parallel to the first direction x, under the condition where the control of movement of the movable unit 30a is not performed.

Accordingly, the range of movement of the movable unit 30a in the first direction x is longer (wider) than that in the second direction y.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

The fixed unit 30b has a buffer member that absorbs the shock at the point of contact with the movable unit 30a (at the boundary of the range of movement).

The hardness of the buffer member is set so that the part making contact, such as the movable unit 30a etc., is not damaged by the shock of the impact, and the dust on the movable unit 30a is removed by the shock of the impact when the movable unit 30a is moved to the boundary of the range of movement of the movable unit 30a and struck against the fixed unit 30b through the buffer member.

In the first embodiment, the buffer member is attached to the fixed unit 30b; however, the buffer member may be attached to the movable unit 30a.

When the center area of the imaging device intersects by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

The rectangle shape, which is the form of the imaging surface of the imaging device, has two diagonal lines. In the first embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electro-magnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b on the side of the movable unit 30a in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b on the side of the movable unit 30a in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected position signal px and the second detected position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected position signal py, which specifies the second coordinate of the position $P_n$ of the movable unit 30a in the second direction y, to the A/D converter A/D 3 of the CPU 21, on the basis of the vertical potential-difference y10.

Next, the main operation of the photographing apparatus 1 in the first embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the interruption process of the timer at the predetermined time interval (1 ms) commences. In step S13, the value of the release state parameter RP is set to 0. The detail of the interruption process of the timer is explained later by using the flowchart in FIG. 5.

In step S14, the value of the dust removal state parameter GP is set to 1, and the value of the dust removal time parameter CNT is set to 0.

In step S15, it is determined whether the value of the dust removal time parameter CNT is greater than 220. When it is determined that the value of the dust removal time parameter CNT is greater than 220, the operation continues to step S16; otherwise, the operation in step S15 is repeated.

In step S16, the value of the dust removal state parameter GP is set to 0.

In step S17, it is determined whether the photometric switch 12a is set to the ON state. When it is determined that the photometric switch 12a is set to the ON state, the operation continues to step S18; otherwise, the operation in step S17 is repeated.

In step S18, it is determined whether the anti-shake switch 14a is set to the ON state. When it is determined that the anti-shake switch 14a is not set to the ON state, the value of the anti-shake parameter IS is set to 0 in step S19; otherwise, the value of the anti-shake parameter IS is set to 1 in step S20.

In step S21, the AE sensor of the AE unit 23 is driven, the photometric operation is performed, and the aperture value and exposure time are calculated.

In step S22, the AF sensor and the lens control circuit of the AF unit 24 are driven to perform the AF sensing and focusing operations, respectively.

In step S23, it is determined whether the release switch 13a is set to the ON state. When the release switch 13a is not set to the ON state, the operation returns to step S17 and the process in steps S17 to S22 is repeated; otherwise, the operation continues on to step S24 and the release sequence operation commences.

In step S24, the value of the release state parameter RP is set to 1. In step S25, the mirror-up operation and the aperture closing operation corresponding to the aperture value, that is either preset or calculated, are performed by the mirror-aperture-shutter unit 18.

After the mirror-up operation is finished, the opening operation of the shutter (the movement of the front curtain in the shutter) commences in step S26.

In step S27, the exposure operation, or in other words the electric charge accumulation of the imaging device (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 18 in step S28.

In step S29, the electric charge which has accumulated in the imaging device during the exposure time is read. In step S30, the CPU 21 communicates with the DSP 19 so that the image processing operation is performed based on the electric charge read from the imaging device. The image, on which the image processing operation is performed, is stored to the memory in the photographing apparatus 1. In step S31, the image that is stored in the memory is displayed on the indicating unit 17. In step S32, the value of the release state parameter RP is set to 0 so that the release sequence operation is finished, and the operation then returns to step S17. In other words, the photographing apparatus 1 is set to a state where the next imaging operation can be performed.

Figure 5:
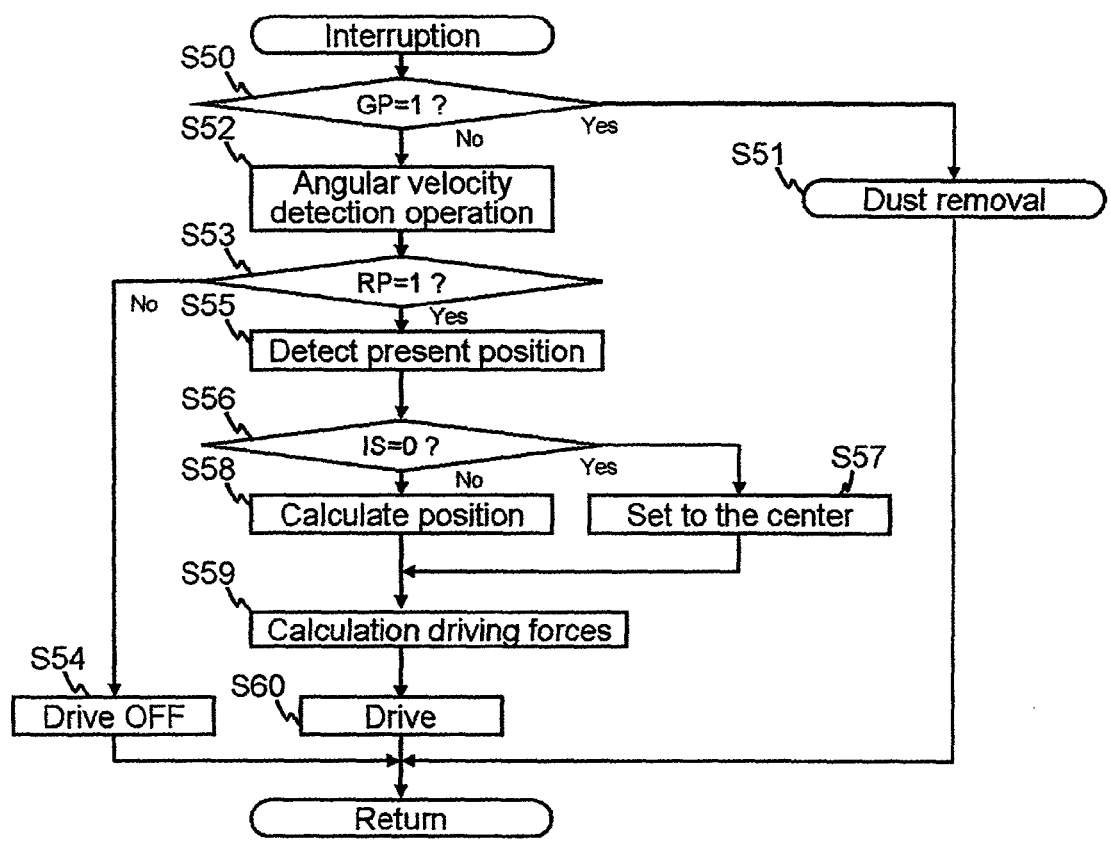
FIG. 5 is a flowchart that shows the detail of the interruption process of the timer in the first and second embodiments.

Next, the interruption process of the timer, which commences in step S12 in FIG. 4 and is performed at every predetermined time interval (1 ms) independent of the other operations, is explained by using the flowchart in FIG. 5.

When the interruption process of the timer commences, it is determined whether the value of the dust removal state parameter GP is set to 1, in step S50. When it is determined that the value of the dust removal state parameter GP is set to 1, the operation continues to step S51; otherwise, the operation proceeds directly to step S52.

In step S51, the dust removal operation is performed. The detail of the dust removal operation is explained later by using the flowchart in FIG. 7.

In step S52, the first angular velocity vx, which is output from the angular velocity detection unit 25, is input to the A/D converter A/D 0 of the CPU 21 and converted to the first digital angular velocity signal $Vx_n$. The second angular velocity vy, which is also output from the angular velocity detection unit 25, is input to the A/D converter A/D 1 of the CPU 21 and converted to the second digital angular velocity signal $Vy_n$ (the angular velocity detection operation).

The low frequencies of the first and second digital angular velocity signals $Vx_n$ and $Vy_n$ are reduced in the digital high-pass filter processing operation (the first and second digital angular velocities $VVx_n$ and $VVy_n$).

In step S53, it is determined whether the value of the release state parameter RP is set to 1. When it is determined that the value of the release state parameter RP is not set to 1, the driving control of the movable unit 30a is set to OFF state, in other words, the anti-shake unit 30 is set to a state where the driving control of the movable unit 30a is not performed in step S54; otherwise, the operation proceeds directly to step S55.

In step S55, the hall element unit 44a detects the position of the movable unit 30a, and the first and second detected position signals px and py are calculated by the hall-element signal-processing unit 45. The first detected position signal px is then input to the A/D converter A/D 2 of the CPU 21 and converted to a digital signal $pdx_n$, whereas the second detected position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S56, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S57. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S58.

In step S59, the first driving force $Dx_n$ (the first PWM duty dx) and the second driving force $Dy_n$ (the second PWM duty dy) of the driving force $D_n$ that moves the movable unit 30a to the position $S_n$ are calculated on the basis of the position $S_n$ ($Sx_n$, $Sy_n$) that was determined in step S57 or step S58, and the present position $P_n$ ($pdx_n$, $pdy_n$).

In step S60, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S59 and S60 is an automatic control calculation that is used with the PID automatic control for performing general (normal) proportional, integral, and differential calculations.

Next, the dust removal operation, which commences in step S51 in FIG. 5, is explained by using the flowchart in FIG. 7.

When the dust removal operation commences, the value of the dust removal time parameter CNT is increased by 1, in step S71.

In step S72, the hall element unit 44a detects the position of the movable unit 30a, and the first and second detected position signals px and py are calculated by the hall-element signal-processing unit 45. The first detected position signal px is then input to the A/D converter A/D 2 of the CPU 21 and converted to a digital signal $pdx_n$, whereas the second detected position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S73, it is determined whether the value of the dust removal time parameter CNT is less than or equal to 65. When it is determined that the value of the dust removal time parameter CNT is less than or equal to 65, the operation proceeds directly to step S84; otherwise, the operation continues to step S74.

In step S74, it is determined whether the value of the dust removal time parameter CNT is less than or equal to 115. When it is determined that the value of the dust removal time parameter CNT is less than or equal to 115, the operation proceeds directly to step S83; otherwise, the operation continues to step S75.

In step S75, it is determined whether the value of the dust removal time parameter CNT is less than or equal to 165. When it is determined that the value of the dust removal time parameter CNT is less than or equal to 165, the operation proceeds directly to step S82; otherwise, the operation continues to step S76.

In step S76, it is determined whether the value of the dust removal time parameter CNT is less than or equal to 215. When it is determined that the value of the dust removal time parameter CNT is less than or equal to 215, the operation proceeds directly to step S78; otherwise, the operation continues to step S77.

In step S77, the driving control of the movable unit 30a is set to the OFF state, in other words, the anti-shake unit 30 is set to a state where the driving control of the movable unit 30a is not performed.

In steps S78 and S83, the value of the second PWM duty dy is set to −DD. In step S82, the value of the second PWM duty dy is set to +DD.

The absolute value |DD| (the absolute value of a dust removal duty ratio DD) is set so that the acceleration of the movable unit 30a at the point in time when the movable unit 30a is moved to and struck against the boundary of the range of movement of the movable unit 30a is increased to the degree where the dust on the movable unit 30a can be removed by the shock of the impact.

In step S79, the coordinate of position $S_n$ in the first direction x, $Sx_n$, where the movable unit 30a (the imaging unit 39a) should be moved in the first direction x, is set at the center of the range of movement of the movable unit 30a in the first direction x.

In step S80, the first driving force $Dx_n$ (the first PWM duty dx) of the driving force $D_n$ that moves (holds) the movable unit 30a to the position $S_n$ in the first direction x (the center in the first direction x), is calculated on the basis of the coordinate of position $S_n$ in the first direction x, $Sx_n$, that was determined in step S79, and the coordinate of the present position $P_n$ after A/D conversion in the first direction x: $pdx_n$.

In step S81, the first driving coil unit 31a is driven by applying the first PWM duty dx calculated in step S80, to the driver circuit 29, and the second driving coil unit 32a is driven by applying the second PWM duty dy calculated in step S78, S82, or S83 to the driver circuit 29, so that the movable unit 30a is moved to position $S_n$ ($Sx_n$, $Sy_n$).

In step S84, the position $S_n$ ($Sx_n$, $Sy_n$) where the movable unit 30a (the imaging unit 39a) should be moved is set at the center of the range of movement of the movable unit 30a.

In step S85, the first driving force $Dx_n$ (the first PWM duty dx) and the second driving force $Dy_n$ (the second PWM duty dy) of the driving force $D_n$ that moves the movable unit 30a to the position $S_n$, are calculated on the basis of the position $S_n$ ($Sx_n$, $Sy_n$) that was determined in step S84, and the present position $P_n$ ($pdx_n$, $pdy_n$).

In step S86, the first driving coil unit 31a is driven by applying the first PWM duty dx to the driver circuit 29 calculated in step S85, and the second driving coil unit 32a is driven by applying the second PWM duty dy to the driver circuit 29 calculated in step S85, so that the movable unit 30a is moved to position $S_n$ ($Sx_n$, $Sy_n$).

Figure 8:
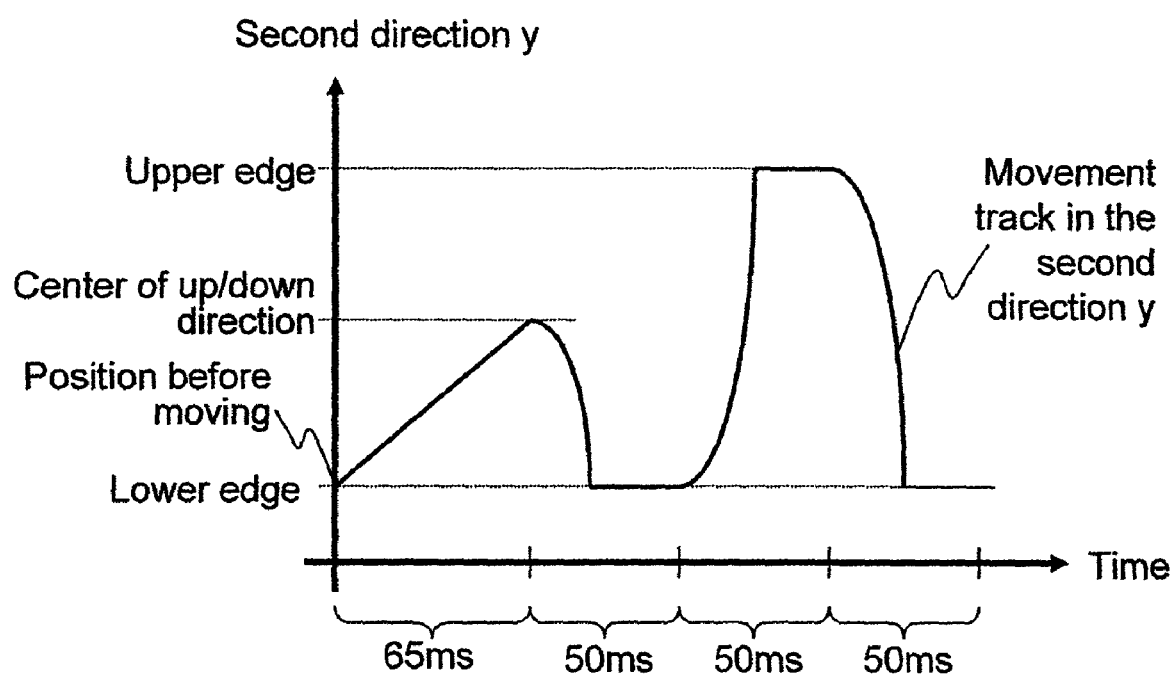
FIG. 8 is a graph that shows the relationship between an elapsed time and the position of the movable unit in the second direction in the dust removal operation.
Figure 9:
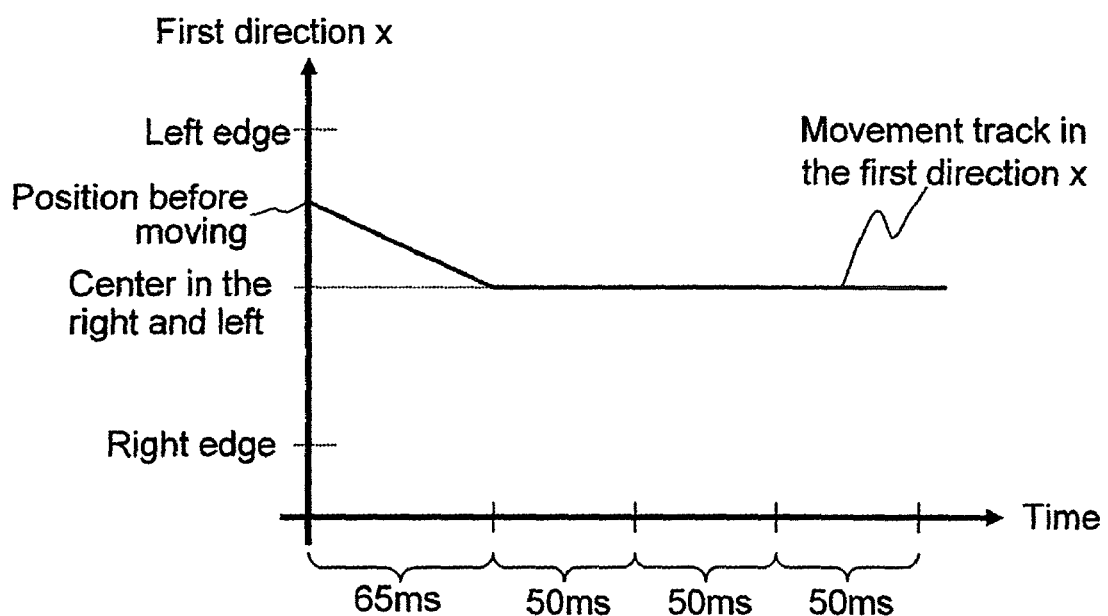
FIG. 9 is a graph that shows the relationship between an elapsed time and the position of the movable unit in the first direction in the dust removal operation.

In the first embodiment, in the first time period, from the point when the photographing apparatus 1 is set to the ON state to the point when the anti-shake operation commences, the movable unit 30a including the imaging device is moved to the center and then is moved to and struck against one side and then the other side of the boundary of the range of movement of the movable unit 30a, under the condition where the coordinate value in the first direction x of the movable unit 30a is held constant at the center (see FIGS. 8 and 9).

The dust on the imaging unit 39a of the movable unit 30a (the imaging device and the low-pass filter) can be removed by the shock of the impact of the movable unit 30a against the boundary of the range of movement of the movable unit 30a.

In the dust removal operation, the position of the movable unit 30a in the first direction x is held constant at the center of the range of movement in the first direction x. Accordingly, the movable unit 30a in the first direction x does not make contact with the boundary of the range of movement in the first direction x while the movable unit 30a is moved in the second direction y. As a result, the movable unit 30a and the fixed unit 30b are not damaged.

Next, the second embodiment is explained. In the second embodiment the first driving force $Dx_n$ (the first PWM duty dx) and the second driving force $Dy_n$ (the second PWM duty dy) are adjusted corresponding to the temperature of a predetermined part of the photographing apparatus 1. The points that differ from the first embodiment are explained as follows.

Figure 10:
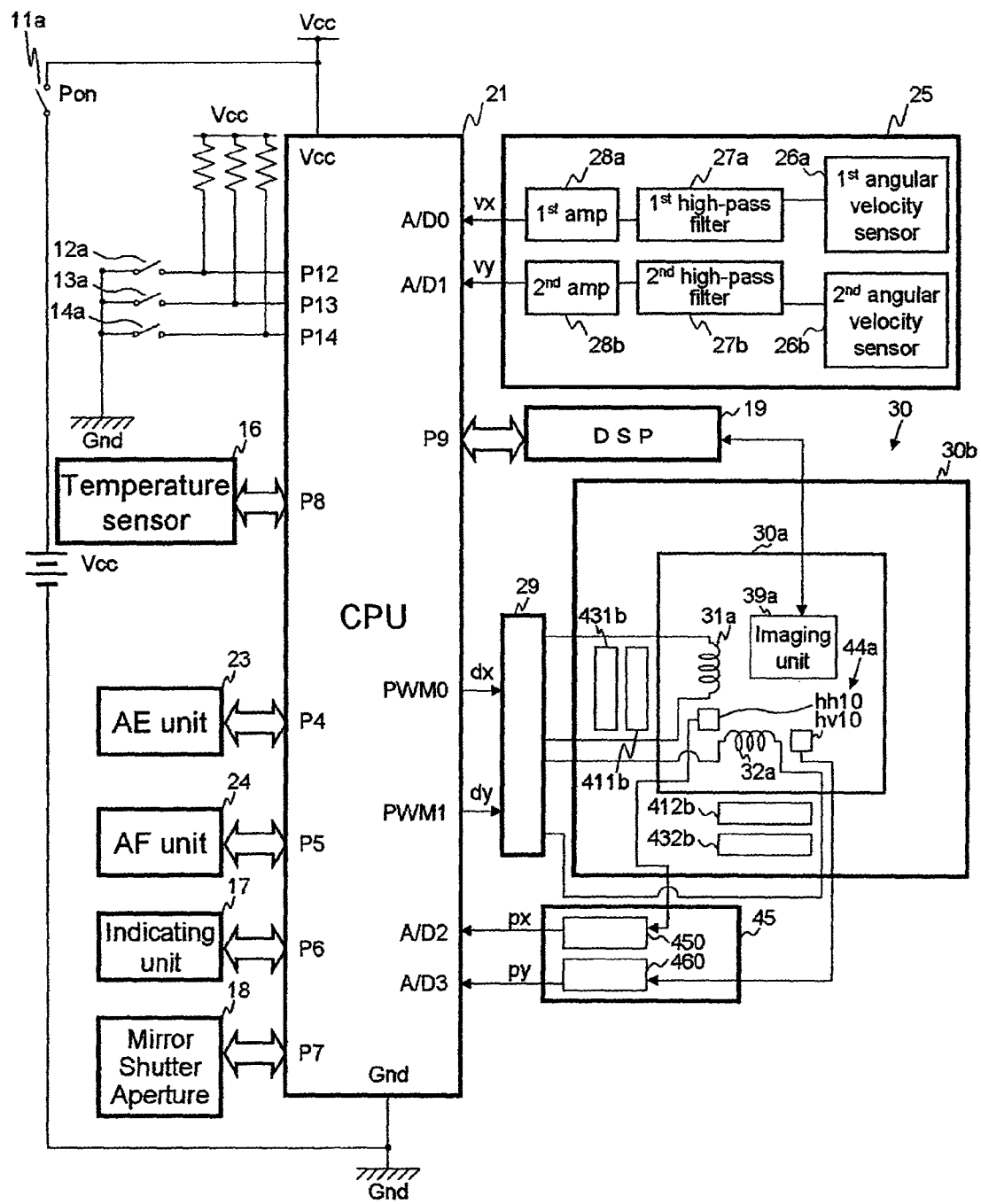
FIG. 10 is a circuit construction diagram of the photographing apparatus in the second embodiment.

The imaging and dust removal part (the dust removal apparatus) of the photographing apparatus 1 comprises a PON button 11, a PON switch 11a, a photometric switch 12a, a release button 13, a release switch 13a, an anti-shake button 14, an anti-shake switch 14a, a temperature sensor 16, an indicating unit 17 such as an LCD monitor etc., a mirror-aperture-shutter unit 18, a DSP 19, a CPU 21, an AE (automatic exposure) unit 23, an AF (automatic focus) unit 24, an anti-shake unit 30, and a camera lens 67 (see FIGS. 1, 2, and 10).

Further, after the PON button 11 is depressed so that the photographing apparatus 1 is set to the ON state, the temperature of the predetermined part of the photographing apparatus 1 is measured by the temperature sensor 16, and the dust removal operation is then performed in the first time period (220 ms).

The temperature sensor 16 is connected to port P8 of the CPU 21 and is arranged at a predetermined part of the photographing apparatus 1, such as a part of the fixed unit 30b at the boundary of the range of movement of the movable unit 30a, to detect the temperature of the surroundings at the boundary of the range of movement of the movable unit 30a, and output the temperature information to the CPU 21.

The CPU 21 calculates the driving force (the duty ratio of the driving pulse corresponding to the driving force) on the basis of the temperature information. To keep a consistent force of impact, the driving force is modified with changes in the detected temperature because the hardness of the buffer member 50b, which consists of rubber material varies with respect to temperature.

The temperature of the predetermined part of the photographing apparatus 1 that is detected by the temperature sensor 16 is temporarily stored in the CPU 21 as a temperature parameter TEMP.

The information regarding the temperature of the predetermined part of the photographing apparatus 1 that is detected by the temperature sensor 16 is used for adjusting the driving force (the duty ratio of the driving pulse corresponding to the driving force), and may be used for another operation, such as an amendment of the focusing operation of the AF unit 24 etc.

Figure 11:
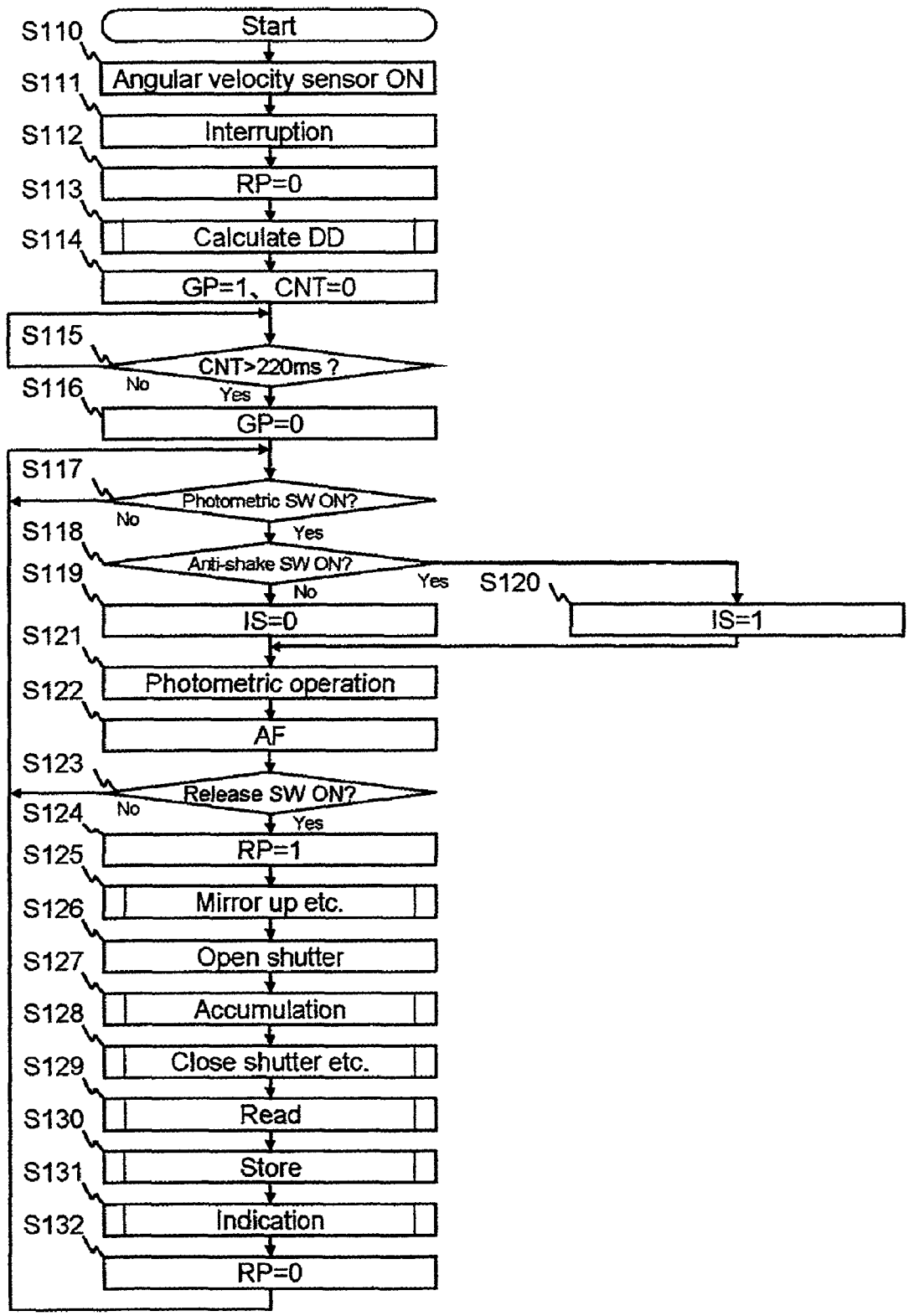
FIG. 11 is a flowchart that shows the main operation of the photographing apparatus in the second embodiment.

The detection of temperature by the temperature sensor 16 is performed after the photographing apparatus is set to the ON state and before the dust removal operation commences (see step S113 in FIG. 11).

The anti-shake part (the anti-shake apparatus) of the photographing apparatus 1 comprises an anti-shake button 14, an anti-shake switch 14*a*, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

The supply of electric power to the CPU 21 and each part of the angular velocity detection unit 25 begins after the PON switch 11*a* is set to the ON state (the main power supply is set to the ON state). The calculation of a hand-shake quantity begins after the PON switch 11*a* is set to the ON state, the detection of temperature by the temperature sensor 16 is finished, and the dust removal operation is finished.

The CPU 21 converts the first angular velocity vx, which is input to the A/D converter A/D 0, to a first digital angular velocity signal $Vx_n$ (A/D conversion operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly, the CPU 21 converts the second angular velocity vy, which is input to the A/D converter A/D 1, to a second digital angular velocity signal $Vy_n$ (A/D conversion operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

"n" is an integer that is greater than 0 and indicates a length of time (ms) from the commencement of the interruption process of the timer, (t=0; see step S111 in FIG. 11) to the point when the latest anti-shake operation is performed (t=n).

In the integration processing operation regarding the first direction x, the first digital displacement angle $Bx_n$ is calculated by the summation from the first digital angular velocity $VVx_0$ at the point when the interruption process of the timer commences, t=0, (see step S111 in FIG. 11) to the first digital angular velocity $VVx_n$ at the point when the latest anti-shake operation is performed (t=n), ($Bx_n=\Sigma VVx_n$, see (3) in FIG. 6).

Similarly, in the integration processing operation regarding the second direction y, the second digital displacement angle $By_n$ is calculated by the summation from the second digital angular velocity $VVy_0$ at the point when the interruption process of the timer commences to the second digital angular velocity $VVy_n$ at the point when the latest anti-shake operation is performed ($By_n=\Sigma VVy_n$).

The anti-shake unit 30 is an apparatus that corrects for the hand-shake effect by moving the imaging unit 39*a* to the position $S_n$, by canceling the lag of the photographing subject image on the imaging surface of the imaging device of the imaging unit 39*a*, and by stabilizing the photographing subject image displayed on the imaging surface of the imaging device during the exposure time when the anti-shake operation is performed (IS=1).

The anti-shake unit 30 has a fixed unit 30*b* that forms the boundary of the range of movement of the movable unit 30*a*, and a movable unit 30*a* which includes the imaging unit 39*a* and can be moved about on the xy plane that is parallel to the first direction x and the second direction y.

During the exposure time when the anti-shake operation is not performed (IS=0), the movable unit 30*a* is fixed in (held at) the predetermined position (at the center of the range of movement).

In the first time period (220 ms) of ter the photographing apparatus 1 is set to the ON state, the movable unit 30*a* is driven first to the predetermined position that is the center of the range of movement. The movable unit 30*a* is then driven to the boundary of the range of movement and struck against the buffer member 50*b* in the second direction y.

Otherwise (except for the first time period and the exposure time), the movable unit 30*a* is not driven (moved).

Figure 13:
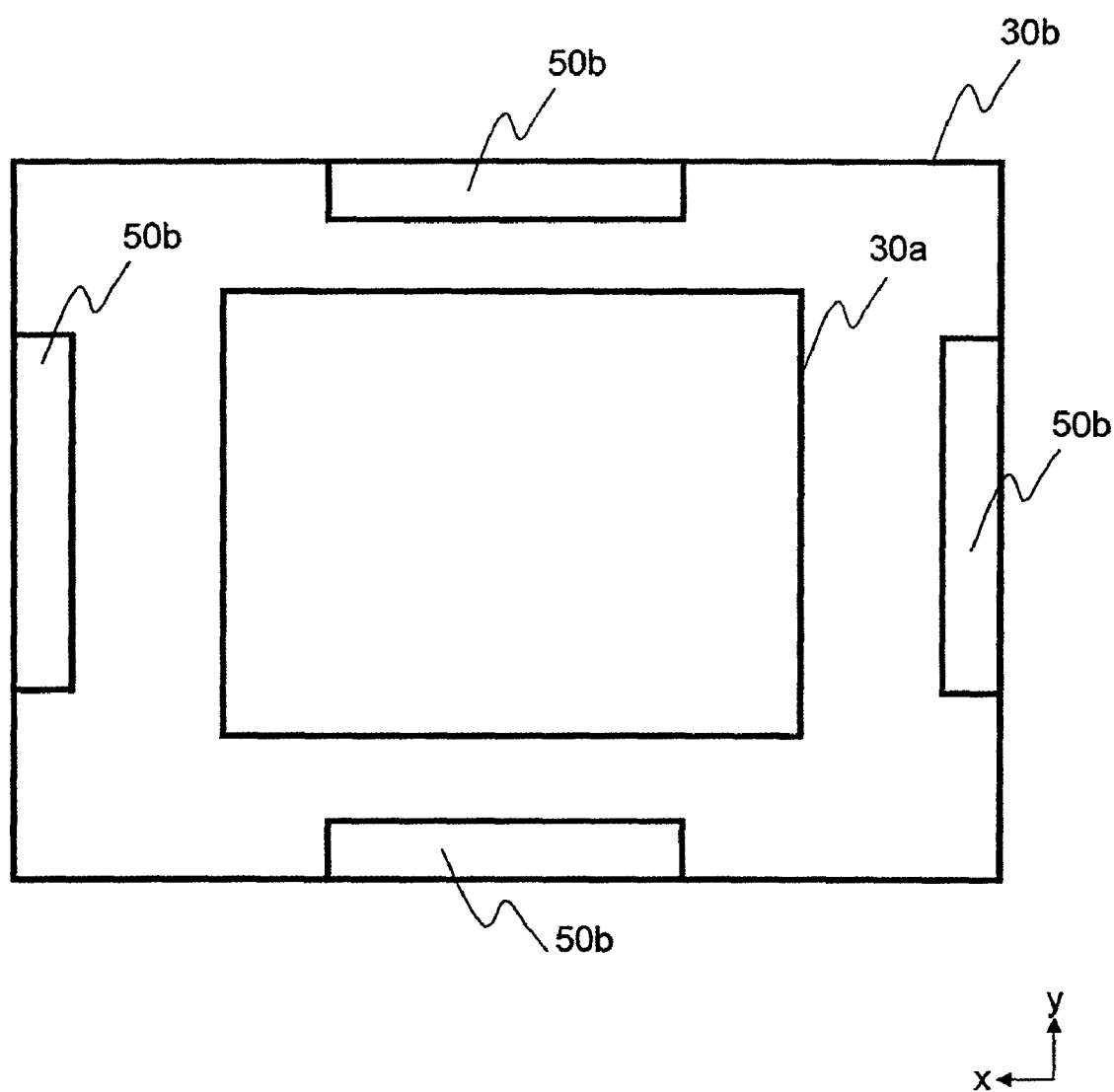
FIG. 13 is a construction diagram of the movable unit, the fixed unit, and the buffer member.

As shown in FIG. 13, the fixed unit 30*b* has a buffer member 50*b* that absorbs the shock at the point of contact with the movable unit 30*a* (at the boundary of the range of movement).

The hardness of the buffer member 50*b* is set so that the part making contact, such as the movable unit 30*a* etc., is not damaged by the shock of the impact, and the dust on the movable unit 30*a* is removed by the shock of the impact when the movable unit 30*a* is moved to the boundary of the range of movement of the movable unit 30*a* and struck against the fixed unit 30*b* through the buffer member 50*b*.

The buffer member 50*b* consists of rubber material so that the buffer member 50*b* has a characteristic that the buffer member 50*b* hardens at low temperature (the hardness of the buffer member 50*b* changes by temperature). Therefore, the driving force (the duty ratio of the driving pulse corresponding to the driving force) for the movable unit 30*a* is controlled corresponding to the temperature so that the dust removal operation can be performed without damaging the movable unit 30*a* and the fixed unit 30*b*. In other words, the driving force of the movable unit 30*a* is adjusted with respect to the temperature fluctuation.

In the second embodiment, the buffer member 50*b* is attached to the fixed unit 30*b*; however, the buffer member 50*b* may be attached to the movable unit 30*a*.

The CPU 21 controls the driving force (the duty ratio of the driving pulse corresponding to the driving force) based on the information regarding the temperature detected by the temperature sensor 16 so that the force of impact caused by striking against the buffer member 50*b* is held constant.

Next, the main operation of the photographing apparatus 1 in the second embodiment is explained by using the flowchart in FIG. 11.

When the photographing apparatus 1 is set to the ON state, the electrical power is supplied to the angular velocity detection unit 25 so that the angular velocity detection unit 25 is set to the ON state in step S110.

In step S111, the interruption process of the timer at the predetermined time interval (1 ms) commences. In step S112, the value of the release state parameter RP is set to 0. The detail of the interruption process of the timer is explained later.

In step S113, the temperature of the predetermined part of the photographing apparatus 1 is detected by the temperature sensor 16. The CPU 21 calculates the driving force (the duty ratio of the driving pulse corresponding to the driving force) for striking the movable unit 30a against the boundary of the range of movement of the movable unit 30a through the buffer member 50b, based on the detected temperature.

In step S114, the value of the dust removal state parameter GP is set to 1, and the value of the dust removal time parameter CNT is set to 0.

In step S115, it is determined whether the value of the dust removal time parameter CNT is greater than 220. When it is determined that the value of the dust removal time parameter CNT is greater than 220, the operation continues to step S116; otherwise, the operation in step S115 is repeated.

In step S116, the value of the dust removal state parameter GP is set to 0.

In step S117, it is determined whether the photometric switch 12a is set to the ON state. When it is determined that the photometric switch 12a is set to the ON state, the operation continues to step S118; otherwise, the operation in step S117 is repeated.

In step S118, it is determined whether the anti-shake switch 14a is set to the ON state. When it is determined that the anti-shake switch 14a is not set to the ON state, the value of the anti-shake parameter IS is set to 0 in step S119; otherwise, the value of the anti-shake parameter IS is set to 1 in step S120.

In step S121, the AE sensor of the AE unit 23 is driven, the photometric operation is performed, and the aperture value and exposure time are calculated.

In step S122, the AF sensor and the lens control circuit of the AF unit 24 are driven to perform the AF sensing and focusing operations, respectively.

In step S123, it is determined whether the release switch 13a is set to the ON state. When the release switch 13a is not set to the ON state, the operation returns to step S117 and the process insteps S117 to S122 is repeated; otherwise, the operation continues on to step S124 and the release sequence operation commences.

In step S124, the value of the release state parameter RP is set to 1. In step S125, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain in the shutter) commences, in step S126.

In step S127, the exposure operation, or in other words the electric charge accumulation of the imaging device (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 18 in step S128.

In step S129, the electric charge which has accumulated in the imaging device during the exposure time is read. In step S130, the CPU 21 communicates with the DSP 19 so that the image processing operation is performed based on the electric charge read from the imaging device. The image, on which the image processing operation is performed, is stored to the memory in the photographing apparatus 1. In step S131, the image that is stored in the memory is displayed on the indicating unit 17. In step S132, the value of the release state parameter RP is set to 0 so that the release sequence operation is finished, and the operation then returns to step S117. In other words, the photographing apparatus 1 is set to a state where the next imaging operation can be performed.

The interruption process of the timer in the second embodiment which commences in step S111 in FIG. 11, is the same as the interruption process of the timer in the first embodiment which commences in step S12 in FIG. 4 and includes the dust removal operation in step S51 in FIG. 4 and the flowchart in FIG. 7.

However, in the second embodiment, the absolute value |DD| (the absolute value of the dust removal duty ratio DD) is further modified corresponding to the temperature detected by the temperature sensor 16. Specifically, when the detected temperature is high, the absolute value |DD| is set high. Similarly, when the detected temperature is low, the absolute value |DD| is set low.

Figure 12:
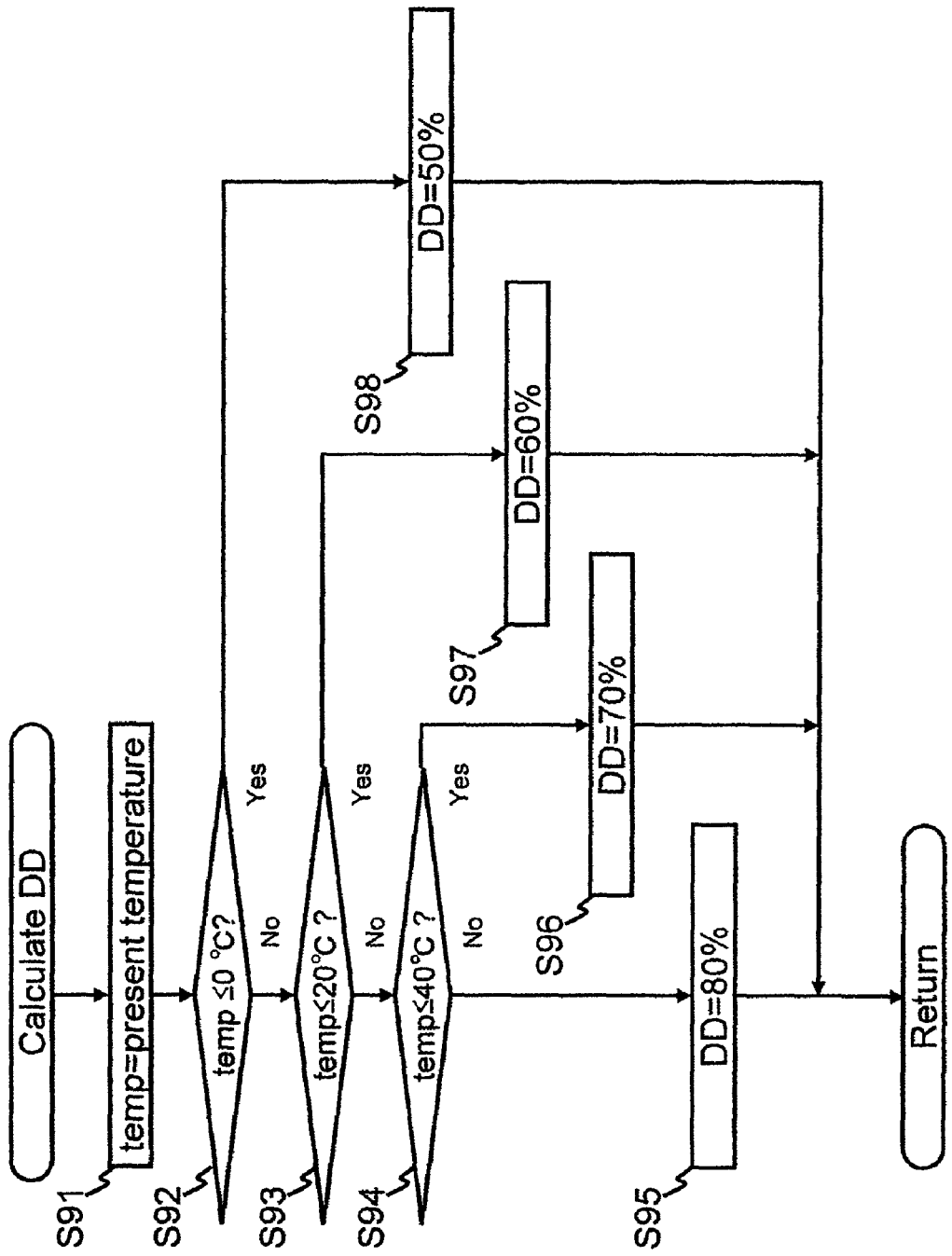
FIG. 12 is a flowchart that shows the calculation of the absolute value |DD| corresponding to the temperature in the second embodiment.

The detail of the calculation of the absolute value |DD| corresponding to the temperature, which is used for setting the value of the second PWM duty dy in steps S78, S82, and S83 in FIG. 7, is explained by using the flowchart in FIG. 12.

When the calculation of the dust removal duty ratio DD commences, the value of the temperature parameter TEMP is set to the present temperature of the predetermined part that is detected by the temperature sensor 16, in step S91.

In step S92, it is determined whether the value of the temperature parameter TEMP is less than or equal to 0° C. When it is determined that the value of the temperature parameter TEMP is less than or equal to 0° C., the operation proceeds directly to step S98; otherwise, the operation continues to step S93.

In step S93, it is determined whether the value of the temperature parameter TEMP is less than or equal to 20° C. When it is determined that the value of the temperature parameter TEMP is less than or equal to 20° C., the operation proceeds directly to step S97; otherwise, the operation continues to step S94.

In step S94, it is determined whether the value of the temperature parameter TEMP is less than or equal to 40° C. When it is determined that the value of the temperature parameter TEMP is less than or equal to 40° C., the operation proceeds directly to step S96; otherwise, the operation continues to step S95.

In step S95, the absolute value of the dust removal duty ratio DD is set to 80%. In step S96, the absolute value of the dust removal duty ratio DD is set to 70%. In step S97, the absolute value of the dust removal duty ratio DD is set to 60%. In step S98, the absolute value of the dust removal duty ratio DD is set to 50%.

In the second embodiment, in the first time period from when the photographing apparatus 1 is set to the ON state to the commencement of the anti-shake operation, the movable unit 30a including the imaging device is moved to the center and then is moved to and struck against one side and then the other side of the boundary of the range of movement of the movable unit 30a, through the buffer member 50b, under the condition where the coordinate value in the first direction x of the movable unit 30a is held constant at the center (see FIGS. 8 and 9).

The dust on the imaging unit 39a of the movable unit 30a (the imaging device and the low-pass filter) can be removed by the shock of the impact of the movable unit 30a against the boundary of the range of movement of the movable unit 30a through the buffer member 50b.

In the dust removal operation, the position of the movable unit 30a in the first direction x is held constant at the center of the range of movement in the first direction x. Accordingly, the movable unit 30a in the first direction x does not make contact with the boundary of the range of movement (through the buffer member 50b) in the first direction x, while the movable unit 30a is moved in the second direction y. As a result, the movable unit 30a and the fixed unit 30b are not damaged.

Further, the driving force (the second PWM duty ratio) for striking is adjusted corresponding to the temperature of the buffer member 50b (the temperature of the photographing apparatus 1). Accordingly, the force of impact caused by striking against the buffer member 50b can be held constant.

Specifically, when the temperature of the buffer member 50b is increased, the buffer member 50b softens so that the force of impact is decreased and the effect of the dust removal operation is decreased. In this case, the driving force is set high.

Similarly, when the temperature of the buffer member 50b is decreased, the buffer member 50b hardens so that the force of impact is increased and the effect of the dust removal operation is increased (the movable unit 30a etc. may be damaged). In this case, the driving force is set low.

Further, in the second embodiment, it is explained that the driving force behind the striking action changes corresponding to the temperature of the buffer member 50b. However, when the temperature is decreased, the resistances of the first and second driving coils 31a and 32a are decreased and the magnetic forces of the first and second position-detecting and driving magnets 411b and 412b are increased so that the electro-magnetic force increases even when the driving force is held constant. Therefore, the driving force may be adjusted corresponding to the temperature of the buffer member 50b to compensate for temperature-related changes in the resistance of the coil and the magnetic force of the magnet.

In this case, when the temperature of the predetermined part of the photographing apparatus 1 is decreased, the adjustment is made to decrease the driving force (the duty ratio is decreased).

Similarly, when the temperature of the predetermined part of the photographing apparatus 1 is increased, the adjustment is made to increase the driving force (the duty ratio is increased).

In the first and second embodiments, in the dust removal operation, the movable unit 30a is held constant at the center in the first direction x (the longer direction) and moved in the second direction y (the shorter direction), under the condition where the range of movement of the movable unit 30a in the first direction x is longer than that in the second direction y. In this case, the possibility of the removed dust re-adhering can be reduced compared to the case where the movable unit 30a is held constant at the center in the second direction y and moved in the first direction x.

However, the movable unit 30a may be held constant at the center in the second direction y and moved in the first direction x.

Further, the position where the movable unit 30a is moved to when the dust removal operation commences is not limited to the center of the range of movement of the movable unit 30a. It may be any position where the movable unit 30a does not make contact with the boundary of the range of movement of the movable unit 30a.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2006-276573 (filed on Oct. 10, 2006) and 2006-276602 (filed on Oct. 10, 2006), which are expressly incorporated herein by reference, in their entirety.

The invention claimed is:

1. A dust removal apparatus of a photographing apparatus, comprising:
    a movable unit that has an imaging device and that is movable;
    a fixed unit that forms a boundary of a range of movement of said movable unit;
    a temperature sensor that detects a temperature of a predetermined part of said photographing apparatus; and
    a controller that moves said movable unit on a plane that is parallel to a first direction and a second direction, said first direction being perpendicular to an optical axis of a photographing optical system that images an optical image on a photographing surface of said imaging device, said second direction being perpendicular to said first direction and said optical axis;
    said controller striking said movable unit against said boundary in said second direction, and controlling a driving force for striking said movable unit against said boundary based on said temperature of said predetermined part, as a dust removal operation.

2. The dust removal apparatus according to claim 1, further comprising a buffer member that is attached to at least one of said movable unit and said fixed unit;
    wherein said controller strikes said movable unit against said boundary in said second direction through said buffer member, as said dust removal operation.

3. The dust removal apparatus according to claim 1, wherein said driving force is decreased when said temperature of said predetermined part is decreased.

4. The dust removal apparatus according to claim 1, wherein said controller moves said movable unit to a predetermined position that does not make contact with said boundary, and strikes said movable unit against said boundary in said second direction under the condition where a coordinate value in said first direction of said movable unit is held constant, as said dust removal operation.

5. The dust removal apparatus according to claim 4, wherein said predetermined position is a center of said range of movement.

6. The dust removal apparatus according to claim 1, wherein impact of said movable unit with said boundary in said second direction as said dust removal operation, is performed so that said controller moves said movable unit to strike against one side of said boundary in said second direction, against the other side of said boundary in said second direction, and against said one side of said boundary in said second direction, in order.

7. The dust removal apparatus according to claim 1, wherein said controller moves said movable unit in said range of movement for an anti-shake operation for image stabilizing; and
    said dust removal operation is performed before said anti-shake operation commences.

* * * * *